(12) United States Patent
Puri et al.

(10) Patent No.: US 9,659,042 B2
(45) Date of Patent: May 23, 2017

(54) DATA LINEAGE TRACKING

(75) Inventors: Colin A. Puri, San Jose, CA (US); Doo Soon Kim, Los Gatos, CA (US); Peter Z. Yeh, San Jose, CA (US); Kunal Verma, Sunnyvale, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 955 days.

(21) Appl. No.: 13/494,449

(22) Filed: Jun. 12, 2012

(65) Prior Publication Data

US 2013/0332423 A1   Dec. 12, 2013

(51) Int. Cl.
  *G06F 17/30*   (2006.01)

(52) U.S. Cl.
  CPC .. *G06F 17/30309* (2013.01); *G06F 17/30368* (2013.01); *G06F 17/30705* (2013.01)

(58) Field of Classification Search
  CPC ......... G06F 17/30563; G06F 17/30377; G06F 17/30598; G06F 17/30309; G06F 17/30705; G06F 17/30368; G06F 11/3636
  USPC ...................................................... 707/687
  See application file for complete search history.

(56) References Cited

U.S. PATENT DOCUMENTS

| | | | |
|---|---|---|---|
| 5,471,631 A * | 11/1995 | Beardsley et al. ............ 713/502 | |
| 6,343,295 B1 * | 1/2002 | MacLeod et al. | |
| 6,434,558 B1 * | 8/2002 | MacLeod .......... G06F 17/30595 | |
| 7,493,570 B2 | 2/2009 | Bobbin et al. | |
| 2005/0050392 A1 * | 3/2005 | Baba ................... G06F 11/2023 714/25 |
| 2005/0165865 A1 * | 7/2005 | Farmer .......................... 707/203 |
| 2006/0064666 A1 * | 3/2006 | Amaru .............. G06F 17/30557 7/100 |
| 2006/0224361 A1 * | 10/2006 | McIntyre et al. ............... 702/183 |
| 2007/0018953 A1 * | 1/2007 | Kipersztok .................... 345/156 |
| 2007/0150293 A1 * | 6/2007 | Dagnino ........................... 705/1 |
| 2007/0150443 A1 * | 6/2007 | Bergholz et al. .................. 707/3 |
| 2007/0150495 A1 * | 6/2007 | Koizumi et al. .............. 707/100 |
| 2008/0086363 A1 * | 4/2008 | Kass et al. ....................... 705/10 |
| 2008/0208923 A1 * | 8/2008 | Watanabe et al. ............ 707/202 |
| 2010/0030824 A1 * | 2/2010 | Shang et al. .................. 707/204 |
| 2010/0138431 A1 * | 6/2010 | Bator ................ G06F 17/30572 707/755 |
| 2011/0066602 A1 * | 3/2011 | Studer ................. G06F 17/2264 707/690 |
| 2012/0017123 A1 * | 1/2012 | Masser et al. .................. 714/45 |

(Continued)

OTHER PUBLICATIONS

Cui et al., "Lineage Tracing for General Data Warehouse Transformations", Jan. 14, 2003, Springer-Verlag.*

(Continued)

*Primary Examiner* — Apu Mofiz
*Assistant Examiner* — Sheryl Holland
(74) *Attorney, Agent, or Firm* — Mannava & Kang, P.C.

(57) ABSTRACT

A data lineage tracking system may include a memory storing a module comprising machine readable instructions to obtain trace log entries representing an interaction with, a manipulation of, and/or a creation of a data value. The data lineage tracking system may further include machine readable instructions to select the trace log entries that are associated with commands performed by an application, cluster similar trace log entries from the selected trace log entries, and analyze mappings between the clustered trace log entries to determine data lineage flow associated with the data value.

20 Claims, 17 Drawing Sheets

(56) References Cited

U.S. PATENT DOCUMENTS

| | | | | |
|---|---|---|---|---|
| 2012/0108259 A1* | 5/2012 | Weiss | ............... | G06Q 30/0261 455/456.1 |
| 2013/0212410 A1* | 8/2013 | Li et al. | ..................... | 713/300 |
| 2014/0114907 A1* | 4/2014 | Kozina | ............ | G06F 17/30592 707/602 |

OTHER PUBLICATIONS

Vaarandi et al. "A Data Clustering Algorithm for Mining Patterns from Event Logs", Oct. 2003, IEEE.*
Foster et al. "Chimera: A Virtual Data System for Representing, Querying and Automating Data Derivation", 2002, IEEE.*
R. Cattell, "Scalable SQL and NoSQL Data Stores", Dec. 2010, SIDMOD Record, vol. 39, No. 4.*
C Puri "Chicken Wings & Data Lineage Who Knew", Aug. 20, 2012, Accenture, www.accenture.com/us-en/blogs/blogs-chicken-wings-amp-data-lineage-who-knew.*
A. Okafor, "Entropy Based Techniques with Applications in Data Mining", 2005, University of Florida, etd.fcla.edu/UF/UFE0013113/okafor_a.pdf, extracted from the Internet Oct. 13, 2016.*
Bandt et al., "Permutation Entropy: A Natural Complexity Measure for Time Series", 2002, The American Physical Society, vol. 88, No. 17.*
Wang et al., "The Entropy Change of Fuzzy Numbers with Arithmetic Operations", 2000, Elsevier Science.*
Fabbri, Daniel, et al., PolicyReplay: Misconfiguration-Response Queries for Data Breach Reporting, Electrical Engineering&Computer Science, Univ. of Michigan, Sep. 2010.
Cu, Yingwei, et al., Tracing the Lineage of View Data in a Warehousing Environment, Computer Science Department, Stanford University, Jun. 2000.
Agrawal, Parag, et al., Trio: A System for Data, Uncertainty, and Lineage, Stanford University InfoLab, Sep. 2006.
Gehani, Ashish, et al., Mendel: Efficiently Verifying the Lineage of Data Modified in Multiple Trust Domains, SRI International, Menlo Park, California, Jun. 2010.
Cui, Yingwei, et al., Lineage Tracing for General Data Warehouse Transformations, Computer Science Department, Stanford University, Sep. 2001.
Puri, et al. "Implementing a Data Lineage Tracker", Planetpuri, 2011, XP002714069, Spinger-Verlag Berlin Heidelberg. Retrieved from the Internet:URL:http://planetpuri.com/colinpuri/Papers/Dexa_2012_DataLineageTracker.pdf [retrieved on Oct. 1, 2013].
Simmhan, et al. "A Survey of Data Provenance Techniques", Oct. 18, 2005, XP002714070, Computer Science Department, Indiana University, Retrieved from the Internet: URL:http://web.archive.org/web/20051018081213/http://www.cs.indiana.edu/pub/techreports/TR618.pdf; [retrieved on Oct. 1, 2013].
Mwebaze, et al. "Tracing and using data lineage for pipeline processing in Astro-Wise", Exp Astron, Dec. 13, 2011, XP882714871, Springerlink.com. Retrieved from the Internet: URL:http://www.rug.nl/science-and-society/target/projects-and-rd/publications/tracing_data_lineage.pdf; [retrieved on Oct. 1, 2013].
"European search report on EP application No. 13002901.0", European Patent Office dated Nov. 7, 2013.
Puri, et al. "Implementing a Data Lineage Tracker", Sep. 3, 2012, Data Warehousing and Knowledge Discovery: 14th International Conference, DAWAK 2012, Vienna, Austria, Sep. 3-6, 2012: Proceedings; [Lecture Notes in Computer Science, ISSN 0302-9743; 7448]Springer, Berlin, Heidelberg, pp. 390-403.
Anonymous: "Amazon.com: Data Warehousing and Knowledge Discovery: 14th International Conference, Dawak 2012, Vienna, Austria, Sep. 3-6, 2012, Proceedings (Lecture Notes in Computer Science): Alfredo Cuzzocrea, Umeshwar Dayal: Books", Amazon.com, Jul. 20, 2012. 4 pages. Retrieved from the Internet: <URL:https://www.amazon.com/Data-Warehousing-KnowledgeDiscovery-International/dp/3642325831 /ref=sr_1_1 ? ie=UTF8&qid=1487343831 &sr=8-1 & keywords=Data+Warehousing+and+Knowledge+Discovery+Da WaK+2012>.
Anonymous: "Call for Papers-Dawak '/DEXA 2012", dexa.org, Nov. 16, 2012, 4 pages. Retrieved from the Internet: <URL:http://web.archive.org/web/20121116073542/http://www.dexa.org/previous/dexa2012/dawak2012.html> [retrieved on Feb. 17, 2017].
Rita L Sallam et al: "Magic Quadrant for Business Intelligence Platforms Analyst(s)", ai.arizona.edu, Jan. 27, 2011 (Jan. 27, 2011), XP055347394, 54 pages. Retrieved from the Internet: <URL:https://ai .arizona.edu/sites/ai/files/MIS510/magic_quadrant_for_busi ness_21 0036.pdf> [retrieved on Feb. 17, 2017].
"European search report on EP application No. 13002901.0", European Patent Office dated Feb. 27, 2017, 20 pages.

* cited by examiner

130

131  132  133

| USERID | NAME  | AGE |
|--------|-------|-----|
| 1      | Alice | 10  |
| 2      | Bob   | 20  |
| 3      | John  | 30  |

FIG. 2A

| USERID | NAME  | AGE |
|--------|-------|-----|
| 1      | Alice | 25  |
| 2      | Bob   | 20  |
| 3      | Dan   | 30  |

| KEY | UID | SQL COMMAND | APP | USERID | NAME | AGE | REFERENCE | ALIVE |
|-----|-----|-------------|-----|--------|------|-----|-----------|-------|
| 1 | 1 | INSERT INTO users VALUES (1, 'Alice', 10) | Create User | 1 | 'Alice' | '10' | 0 | 1 |
| 2 | 2 | INSERT INTO users VALUES (1, 'Bob', 20) | Create User | 2 | 'Bob' | '20' | 0 | 1 |
| 3 | 3 | INSERT INTO users VALUES (1, 'John', 30) | Create User | 3 | 'John' | '30' | 0 | 1 |

FIG. 3

| KEY | UID | SQL COMMAND | APP | USERID | NAME | AGE | REFERENCE | ALIVE |
|---|---|---|---|---|---|---|---|---|
| 1 | 1 | INSERT INTO users VALUES (1, 'Alice', 10) | Create User | 1 | 'Alice' | '10' | 0 | 1 |
|  | 4 | UPDATE users SET Age=25 WHERE userid=1 | Audit User | -- | -- | '25' | 1 | 1 |
| 2 | 2 | INSERT INTO users VALUES (1, 'Bob', 20) | Create User | 2 | 'Bob' | '20' | 0 | 1 |
| 3 | 3 | INSERT INTO users VALUES (1, 'John', 30) | Create User | 3 | 'John' | '30' | 0 | 1 |
|  | 6 | DELETE FROM users WHERE id=3 | Audit User | -- | -- | -- | 3 | 0 |
| 4 | 5 | INSERT INTO users VALUES (1, 'Dan', 30) | Create User | 4 | 'Dan' | '30' | 0 | 1 |
|  | 7 | UPDATE users SET userid=3 WHERE userid=4 | Audit Users | 3 | -- | -- | 5 | 1 |

SELECT name From A WHERE id = "a"
UPDATE salary WHERE id = "c"
SELECT name From A WHERE id = "b"
UPDATE salary WHERE id ="a"
SELECT name From A WHERE id = "a"
UPDATE salary WHERE id = "b"
SELECT name From A WHERE id = "a"
UPDATE salary WHERE id = "d"
......

| | A | B | C | D | E | F | G | K | L | M |
|---|---|---|---|---|---|---|---|---|---|---|
| | File | | | | | | | | | |
| | Asset: | Bank... | | Get Data | | Get Lineage | | Webservice Location | e/Service.asmx | Save |
| | Resource: | B_Main_... | | | | Get Dataflow | | | | |
| | Table: | loansummary | | | | | | | | |
| | | | | | | Lineage Information | | | | |
| 1 | | | | | | | | | | |
| 2 | | loantype | loantype | totalamount | risk | | Lineage | Data Row | | |
| 3 | | 1 | car | 2250 | low | | View Grid Layout | | | |
| 4 | | 2 | boat | 0 | med | | - Insertion occurred at "8/12/2011 4:19:3 PM" | | | |
| 5 | | 3 | plane | 10000 | med | | - Attribute: id | | | |
| 6 | | 4 | home | 180000 | low | | - Value: | | | |
| 7 | | 5 | homeimp | 10000 | low | | - Application: Loan Aggregation | | | |
| 8 | | 6 | armhome | 499999 | high | | - Reason: Aggregates all loans over al | | | |
| 9 | | | | | | | - Who: DATALINEAGE\Administrator | | | |
| 10 | | | | | | | - An Update occurred at "8/15/2011 4:19:38 PM" | | | |
| 11 | | | | | | | - Attribute: id ← 201 | | | |
| 12 | | | | | | | - Value: low | | | |
| 13 | | | | | | | - Application: LRC_Main | | | |
| 14 | | | | | | | - Reason: | | | |
| 15 | | | | | | | - Who: DATALINEAGE\Administrator | | | |
| 16 | | | | | | | | | | |
| 17 | | | | | | | | | | |
| 18 | | | | | | | | | | |
| 19 | | | | | | | | | | |
| 20 | | | | | | | | | | |
| 21 | | | | | | | | | | |

FIG. 13

DATA LINEAGE TRACKING

BACKGROUND

Data lineage may include, for example, information related to the historical value of data, or information related to any system or application that has encountered the data or manipulated intermediate results related to the data before arriving at a final data value. Tracking data lineage, for example, in computing environments that may include heterogeneous computing systems can be challenging.

BRIEF DESCRIPTION OF DRAWINGS

Features of the present disclosure are illustrated by way of examples shown in the following figures. In the following figures, like numerals indicate like elements, in which:

FIG. 2A illustrates a simplified example of an aggregate view of data in a database, according to an example of the present disclosure;

FIG. 2B illustrates a simplified example of an aggregate view of the data of FIG. 2A after a series of operations, according to an example of the present disclosure;

FIG. 3 illustrates a backlog trace for the data of FIG. 2A, according to an example of the present disclosure;

FIG. 4 illustrates a backlog trace for the data of FIG. 2B, according to an example of the present disclosure;

FIG. 13 illustrates a display of aggregated data value lineage information using an application, according to an example of the present disclosure;

DETAILED DESCRIPTION

Figure 1:
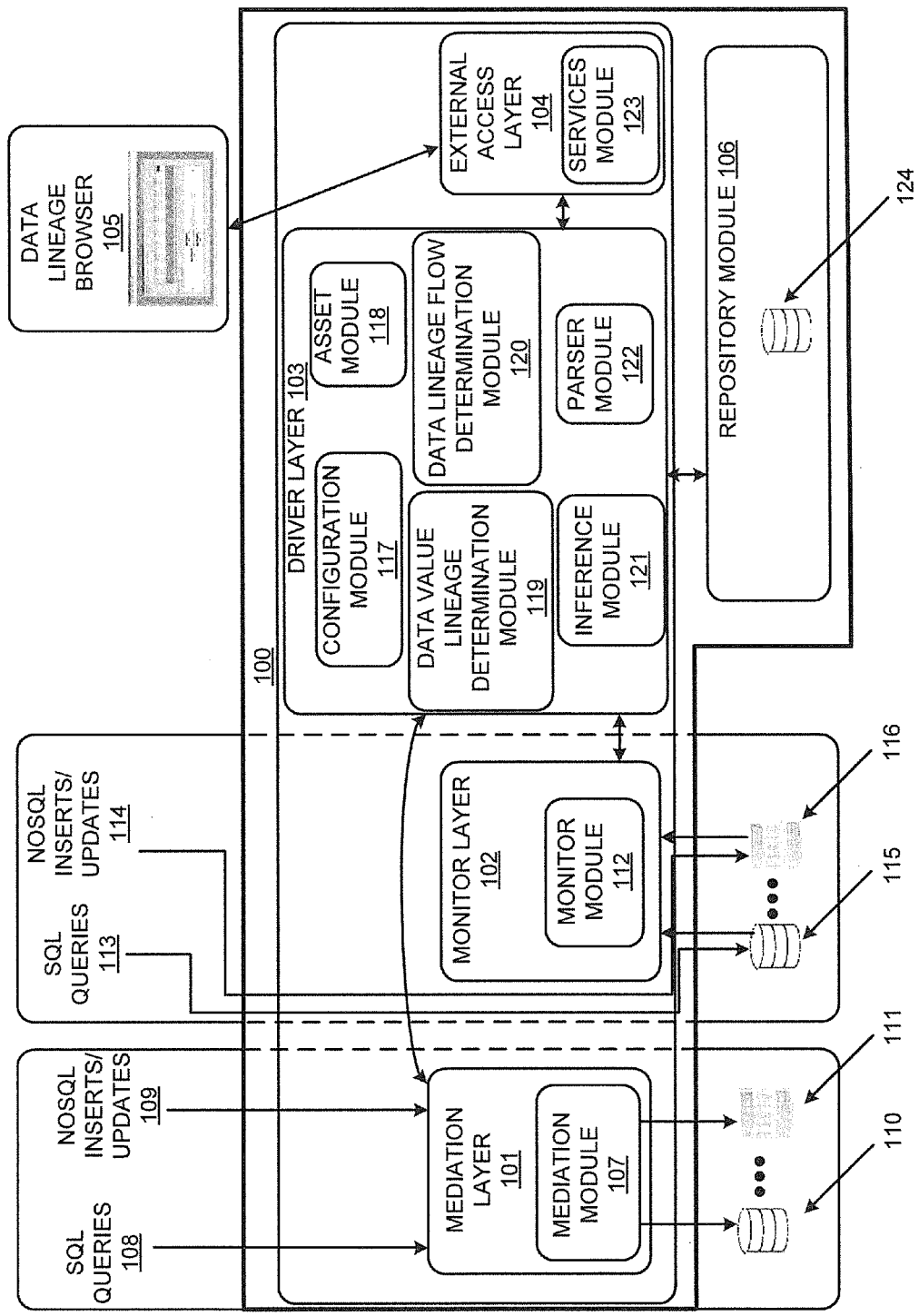
FIG. 1 illustrates an architecture of a data lineage tracking system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

Data lineage information may generally include meta-data that captures information related to the history and provenance of data. In environments such as, for example, enterprise environments, data may pass through various systems and subsystems. Such systems and subsystems may include applications that consume and export data, or applications that may or may not modify the data. For example, data may be aggregated or otherwise manipulated, and may also reside, for example, in databases, documents, spreadsheets, or emails. In such environments, data lineage information may become obscured, may contain gaps, or may even become lost.

Data lineage may be used in a variety of environments, for example, for understanding aspects related to the origin of and changes to data, and for making decisions based on the understanding. The degree of knowledge related to the historical value of data, or which systems or applications have encountered data or manipulated intermediate results can affect the confidence of such decisions. For example, business users generally have limited time and limited resources to ascertain the origins and lifecycle of data. Such limitations in time and resources can affect the confidence of decisions based on available data.

In enterprise environments, data lineage tracking can be challenging, for example, due to the heterogeneity of systems encountered by the data. For example, data may encounter structured query language (SQL) or NoSQL database systems. Data may also flow from one data source to another, or via an application that may or may not change the data along its path. Tracking and producing data flows for such heterogeneous systems, and tracking data changes as the data encounters various systems and applications can present difficulties in determining the veracity and authenticity of data.

A data lineage tracking system and method are described herein and generally capture data lineage information, manage meta-data, track and produce data flows, infer reasoning for changes, perform anomaly detection, and report data lineage information across heterogeneous platforms and applications. In one example, the system and method may use trace logs from data sources to track data lineage, and to determine data flows of information as data moves from one data source to another through the execution of applications. The utilization of the captured information may be used, for example, for enterprise activities such as, for example, producing shorter decision-making cycles, facilitating more efficient and cost-effective compliance and audit cycles, enhancing data loss prevention, for example, for data aggregation situations, facilitating access control, and enrichment of data analytics.

In an example, a data lineage tracking system may include a memory storing a module comprising machine readable instructions to obtain trace log entries representing an interaction with, a manipulation of, and/or a creation of a data value. The data lineage tracking system may further include machine readable instructions to select the trace log entries that are associated with commands performed by an application, cluster similar trace log entries from the selected trace log entries, and analyze mappings between the clustered trace log entries to determine data lineage flow associated with the data value. The mappings may generally represent any type of relationship between clustered trace log entries. The data lineage flow may represent flow of information related to the historical value of data, or flow of information related to any system or application that has encountered the data or manipulated intermediate results related to the data before arriving at a final data value. In a similar context, data lineage may include, for example, information related to the historical value of data, or information related to any system or application that has encountered the data or manipulated intermediate results related to the data before arriving at a final data value.

The data lineage tracking system may further include machine readable instructions to determine data value lineage by determining a first command associated with an interaction with, a manipulation of, and/or a creation of the data value, determining a second command associated with an interaction with and/or a manipulation of the data value, and linking the second command to the first command by setting a reference value for the second command to a unique identification (ID) for the first command.

In an example, a method for data lineage tracking may include obtaining trace log entries representing an interaction with, a manipulation of, and/or a creation of a data value, and selecting the trace log entries that are associated with commands performed by an application. The method may further include clustering similar trace log entries from the selected trace log entries, and analyzing mappings between the clustered trace log entries to determine data lineage flow associated with the data value.

In an example, a non-transitory computer readable medium having stored thereon machine readable instructions for data lineage tracking is also described. The machine readable instructions that when executed may cause a computer system to obtain trace log entries representing an interaction with, a manipulation of, and/or a creation of a data value, and select the trace log entries that are associated with commands performed by an application. The machine readable instructions may further cause a computer system to cluster similar trace log entries from the selected trace log entries, and analyze mappings between the clustered trace log entries to determine data lineage flow associated with the data value.

The system and method described herein provide a technical solution to the technical problem of data lineage tracking. In many instances, manual data lineage tracking is not a viable solution given the heterogeneity and complexity of systems and subsystems, and variability involved in manual data lineage tracking, which can lead to inconsistent results. The system and method described herein provide the technical solution of objectively discovering data lineage information based on, for example, automatic capture of data lineage information, management of meta-data, tracking and producing of data flows, performance of anomaly detection, and reporting of data lineage information across heterogeneous platforms and applications.

2. System

FIG. 1 illustrates an architecture of a data lineage tracking system 100, according to an example of the present disclosure. The data lineage tracking system 100 may generally include a mediation layer 101, a monitor layer 102, a driver layer 103 and an external access layer 104. As described in further detail below, the mediation and monitor layers 101 and 102 may generally include modules to track lineage data for newly developed and existing assets, respectively. Assets may include, for example, a database, server or computer on which a data source of interest may reside. The driver layer 103 may generally include modules to register and track assets, resources, and applications, determine data value lineage, determine data lineage flow existing within tracked data lineage, determine reasonings for actions, and interpret SQL traces. A resource may include an actual data source of interest. A resource may reside on an asset, and include, for example, a data source name, login, password, SQL dialect, and type of lineage modality (i.e., mediation or monitor) to utilize for tracking. Further, applications may refer, for example, to programs that perform manipulations and retrieval of data from the data sources. The external access layer 104 may generally provide access and services to integrate external tools and applications, for example, by a data lineage browser 105. The data lineage browser 105 may also function as a user interface, for example, to register assets, resources, and applications, and to visualize data value lineage and data lineage flow. A repository module 106 may store data traces transformed into a data lineage format by the data lineage tracking system 100.

As described herein, the modules and other elements of the system 100 may comprise machine readable instructions stored on a non-transitory computer readable medium. In addition, or alternatively, the modules and other elements of the system 100 may comprise hardware or a combination of machine readable instructions and hardware.

Referring to FIG. 1, the mediation layer 101 may include a mediation module 107 to track lineage data, for example, for newly developed assets. Calls to an asset may be transferred by the mediation module 107 to the driver layer 103 for further processing. The calls may be transferred, for example, through a web service. The calls may include, for example, SQL queries 108 or NoSQL inserts/updates 109, which may be stored in databases 110, 111, respectively, or in a single database. The calls may be used to ascertain additional statistics related to data, such as, for example, alias information, invocation information, name of an asset, etc. The mediation module 107 may also provide for enrichment of meta-data information for association with an action, and context of the data. The mediation module 107 may also function as a listening post within an application such that when an application interacts with a database, the mediation module 107 may intercept the interaction and log the interaction within the database.

The monitor layer 102 may include a monitor module 112 to track lineage data for existing assets. Compared to the mediation module 107, the monitor module 112 may provide integration of the data lineage tracking system 100, for example, in an enterprise environment, without modification of existing assets. The monitor module 112 may poll a data source, retrieve information related to queries executing on a resource, processes captured trace log entries, and store the trace log entries for retrieval by the modules of the driver layer 103. The information may include, for example, SQL queries 113 or NoSQL inserts/updates 114, which may be stored in databases 115, 116, respectively, or in a single database. A user may also provide the location of the trace log files as well as the frequency of polling. If the available assets are unknown, the system 100 may automatically discover assets.

The driver layer 103 may include a configuration module 117 to register assets, resources, and applications, an asset module 118 to track assets and resources, a data value lineage determination module 119 to determine data value lineage, a data lineage flow determination module 120 to determine data flows existing within tracked data lineage, an inference module 121 to determine reasonings for actions, and a parser module 122 to interpret SQL traces.

Figure 11:
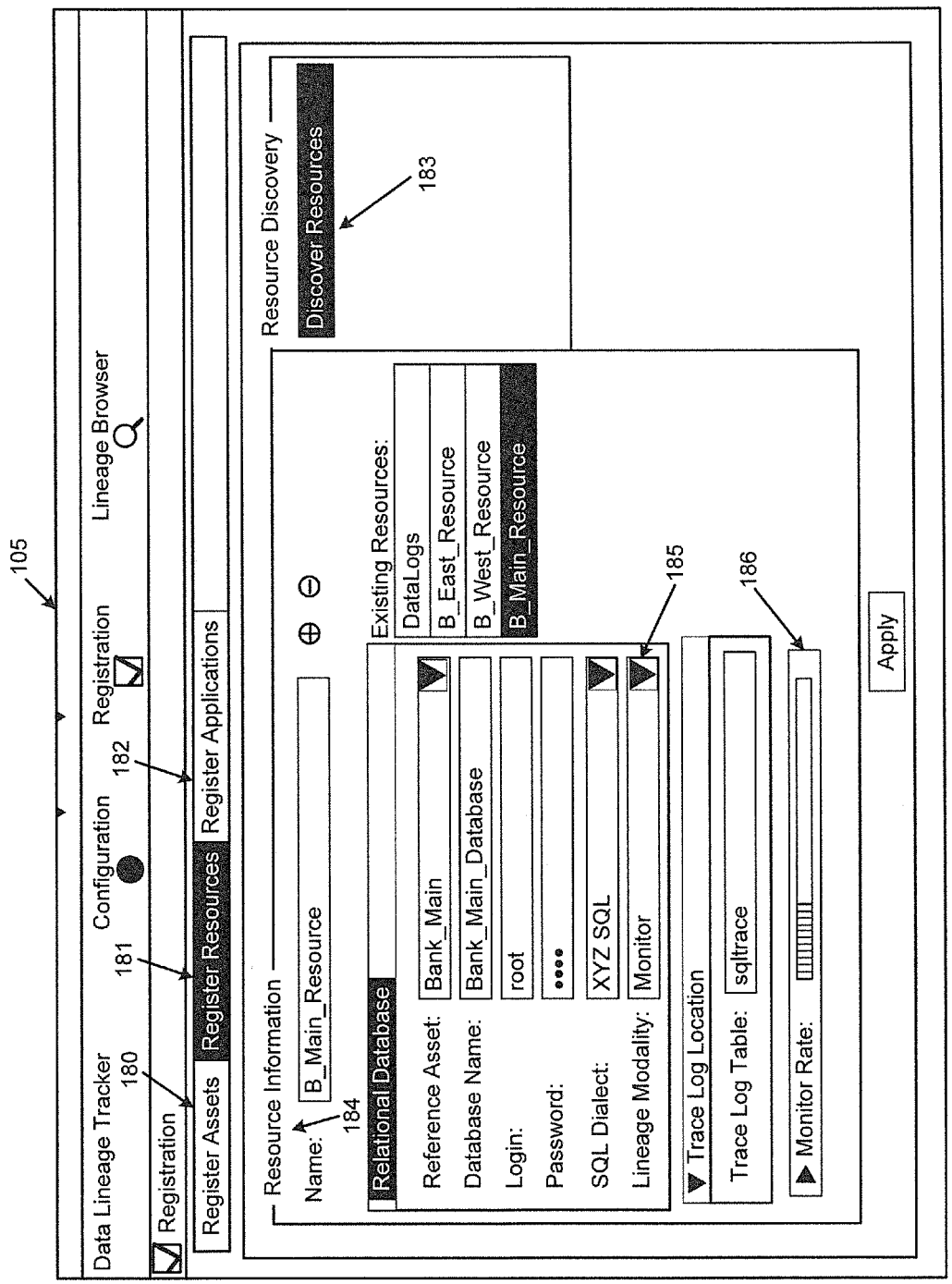
FIG. 11 illustrates a user interface layout for registration of assets, resources, and applications, according to an example of the present disclosure.

Referring to FIGS. 1 and 11, the configuration module 117 in conjunction with the data lineage browser 105 may register assets, resources, and applications specified at the browser 105. Further, the configuration module 117 may function as a bridge for settings between other modules and layers of the data lineage tracking system 100. For example, a user, via the browser 105 and configuration module 117, may modify user-specific settings of the system 100. Examples of user-specific settings may include settings related to the types of assets, resources, and applications registered, output or display settings related to data value lineage or data lineage flow, thresholds for data lineage anomaly detection, and thresholds for consistency determination, as described below.

The asset module 118 may track assets and resources. The module 118 may maintain the connections of all assets with resources that reside on the assets. Data lineage information on the repository module 106 may also be maintained and formatted by the module 118. The module 118 may further track registered assets and resources, and track data lineage using the repository module 106.

The data value lineage determination module 119 may determine data value lineage. As described below, the determination of data value lineage may be performed by analysis of data trace log entries to determine a backlog trace, which transforms the data trace log entries into a data lineage format stored in the repository module 106.

The data lineage flow determination module 120 may determine data flows existing within tracked data lineage. The determination of data flows may be performed by clustering and discovering of patterns in SQL traces, as described below.

The inference module 121 may determine reasonings for actions. For example, the module 121 may determine why and how an action has occurred (e.g., why a "SELECT" action occurred). The module 121 may determine any manipulations that may have occurred to data as the data passes through databases and applications. For example, as applications gather information from multiple sources they may modify information before it is sent to the destination. The module 121 may determine why and how an action has occurred based, for example, on information from a combination of assets, resources, and applications that is entered during configuration. From such information, the module 121 may perform look-ups to determine, for example, why an action has occurred. The determination may also be based on previous knowledge that has been provided to the module 121 and on the discovered asset-resource-application combination in a data trace entry. The module 121 may also determine what actions were performed on data by an application, for example, in the time between when data is retrieved from a source and stored at a destination. The determination of actions performed by an application may be based on an analysis of information from the backlog trace and data lineage flow.

The parser module 122 may integrate grammar sets to interpret SQL traces. For example, each resource type may have its own dialect and language. The module 122 may automatically determine which grammar to use to divide SQL traces into actionable objects that have gone through interpretation. The interpretations may be associated with related actions of previous SQL traces within the asset module 118. After linking the actionable SQL traces to each other, the results may be transferred to the repository module 106 for storage and retrieval in data value lineage and data lineage flow discovery requests.

The external access layer 104 may include a services module 123 to provide access and services to integrate external tools and applications, for example, by the data lineage browser 105. Examples of tools may include external user tools that may use a web service interface, such as, for example, MICROSOFT WORD or MICROSOFT EXCEL. The external access layer 104 may also provide for integration with external tools such as, for example, MICROSOFT OFFICE SUITE, which may also allow users to track data and embed data persistent lineage information within documents. The services module 123 may provide administration configuration functionality for adding assets, resources, and applications. The services module 123 may also control functionality of the data lineage browser 105 to ascertain user inputs and output information, such as, for example, data value lineage and data lineage flow.

The repository module 106 may store data traces transformed into a data lineage format by the data lineage tracking system 100. The transformed data traces may be stored in a database 124. The repository module 106 may be compatible with different storage formats, such as, for example, SQL and NoSQL storage formats.

Operation of the data lineage tracking system 100 is described.

In order to store data traces transformed into a data lineage format in the repository module 106, the data traces captured by the mediation or monitor modules 107, 112 may be initially received by the modules of the driver layer 103. Generally, the data traces may be analyzed to determine a backlog trace, which transforms the data traces into the data lineage format stored in the database 124 of the repository module 106. The backlog trace may be based on tracking differences between different data traces, grouping of touples that reference each other, time-stamping based on lineage creation and time-stamping based on SQL trace command. The backlog trace may also be based on and include additional information, such as, for example, unique identifiers for each data trace, a liveliness indicator, and the analysis of actual SQL commands.

For example, referring to FIGS. 2A-4, an example of determination of a backlog trace and further details of data value lineage determination are presented.

Referring to FIG. 2A, a simplified example of an aggregate view of data 130 in a database is illustrated. The data 130 may include a user identification (ID) at 131, and data values, such as a name at 132 and age at 133. Thus a data value may be encompass any type of data, such as, for example, a numerical, character based, symbolic or other value. After a series of operations on the data 130 of FIG. 2A, FIG. 2B illustrates an aggregate view of the data 130 after the series of operations. Comparing the data of FIGS. 2B and 2A, it can be seen that the age for the user "Alice" has been changed from 10 to 25, and the name for the user "John" has been changed to "Dan". An analysis of the change in the data of FIGS. 2A and 2B however does not indicate, for example, how the modifications were made, the command order, what type of commands were issued, if an update was executed on the effected records, or were other operations issued to arrive at the results of FIG. 2B.

The backlog trace may use original data executes and inserts information to link subsequent manipulations on records within a database. For example, referring to FIG. 3, for the data 130 of FIG. 2A, the initial data may be entered as a series of inserts. The backlog trace 134 of FIG. 3 may include a key at 135, unique identifier (UID) at 136, SQL command at 137, an application type at 138, a user ID at 139, name at 140, age at 141, reference at 142 and liveliness indicator at 143.

Referring to FIG. 4, following, for example, update and insert commands at 144, 145, respectively (i.e., "UPDATE users SET Age=25 WHERE userid=1" and "INSERT INTO users VALUES (1, 'Dan', 30)"), the backlog trace may be transformed as shown at 146. The data value lineage determination module 119 may perform an insertion of any command that manipulates any existing data (i.e., the data 130) and link the inserted command to the last command that performed any manipulation. For the UPDATE command in the foregoing example, the data value lineage determination module 119 may perform a query on the backlog trace to locate all records affected by the UPDATE command and link the records. Once all related commands are located, the new command may be inserted and its reference column (i.e., column 142 of FIG. 3) may be set to the unique ID (i.e., column 136 of FIG. 3) value of a previous command. For the INSERT command in the foregoing example, the data value lineage determination module 119 may insert a new entry in the backlog trace. FIG. 4 further illustrates the effect of DELETE and UPDATE commands. On a replay of events, the sequence of commands of FIG. 4 may produce the result of FIG. 2B. The sequence of commands of FIG. 4 demonstrates the sequence of events that may lead to the resulting data of FIG. 2B. The resulting backlog trace may be stored in the database 124 of the repository module 106.

In order to determine data flows existing within tracked data value lineage, the data lineage flow determination module 120 may use trace log entries for each database that is registered. Generally, the module 120 may link trace log entries from multiple databases to determine data lineage flow for a set of SQL commands that contribute to instances of existing values across multiple backlog trace entries. For example, referring to FIG. 5, the module 120 may link trace log entries 150, 151 and 152, respectively, for databases A, B and C, to determine data lineage flow. The module 120 may also account for various properties of trace log entries that may impact data lineage flow determination. For example, the trace log entries for a database may be limited to SQL commands, related timestamps, and an application issuing a particular command. The trace log entries may also be noisy or disjointed, for example, due to missing trace log entries or inadvertent modification from runtime issues. Further, a database may include a large number of trace log entries. The module 120 may account for the foregoing properties related to trace log entries by using a statistics based data mining approach that may discover the sequence of commands that an application may perform. The sequence of commands may include, for example, select, insert, update and delete. Other commands may be discovered based on user-specific requirements.

In order to determine sequences for applications, the data lineage flow determination module 120 may group the trace log commands issued by an application, based on the behavior that an application generally executes a sequence of commands repeatedly with consistent time intervals between the commands. For each application, the module 120 may cluster similar trace log entries that relate, for example, according to the tables that are affected and attributes involved. For example, the statements "SELECT name FROM employee WHERE id=3" and "SELECT name FROM employee WHERE id=5" may be clustered together because the command type, table name, and attribute name are identical. For every pair of command type clusters, the module 120 may measure the variability of the temporal difference between trace log entries in the two paired clusters. Given two command clusters, $c_1$ and $c_2$, the module 120 may identify the mappings of traces between the two command clusters. If a command-timestamp pair, $(s_1, t_1)$, is mapped to another command-timestamp pair, $(s_2, t_2)$, (where $s_1$ and $s_2$ are trace entry commands from $c_1$ and $c_2$, and $t_1$ and $t_2$ are timestamps for the corresponding trace entries) then the mappings should satisfy the following two conditions. First, there does not exist a $s_1'$ in $c_1$ such that $|t_1'-t_2|<|t_1-t_2|$, and second, there does not exist a $s_2'$ in $c_2$ such that $|t_1'-t_2|<|t_1-t_2|$. Once the mappings are identified, the module 120 may calculate the entropy of the temporal differences (i.e., $t_1-t_2$) to measure the consistency of the temporal differences. If the temporal differences vary significantly, the entropy score may be high and the module 120 may discard the mapping. The module 120 may construct a cluster chain $C=\{c_1, c_2, \ldots c_n\}$ of low entropies (i.e., entropies that fall below a predetermined threshold, which may be user-defined), which correspond to a sequence of trace log entries that an application performs, and the data lineage flow.

Referring to FIGS. 5-10, an example and further details of data lineage flow determination are presented.

Figure 5:
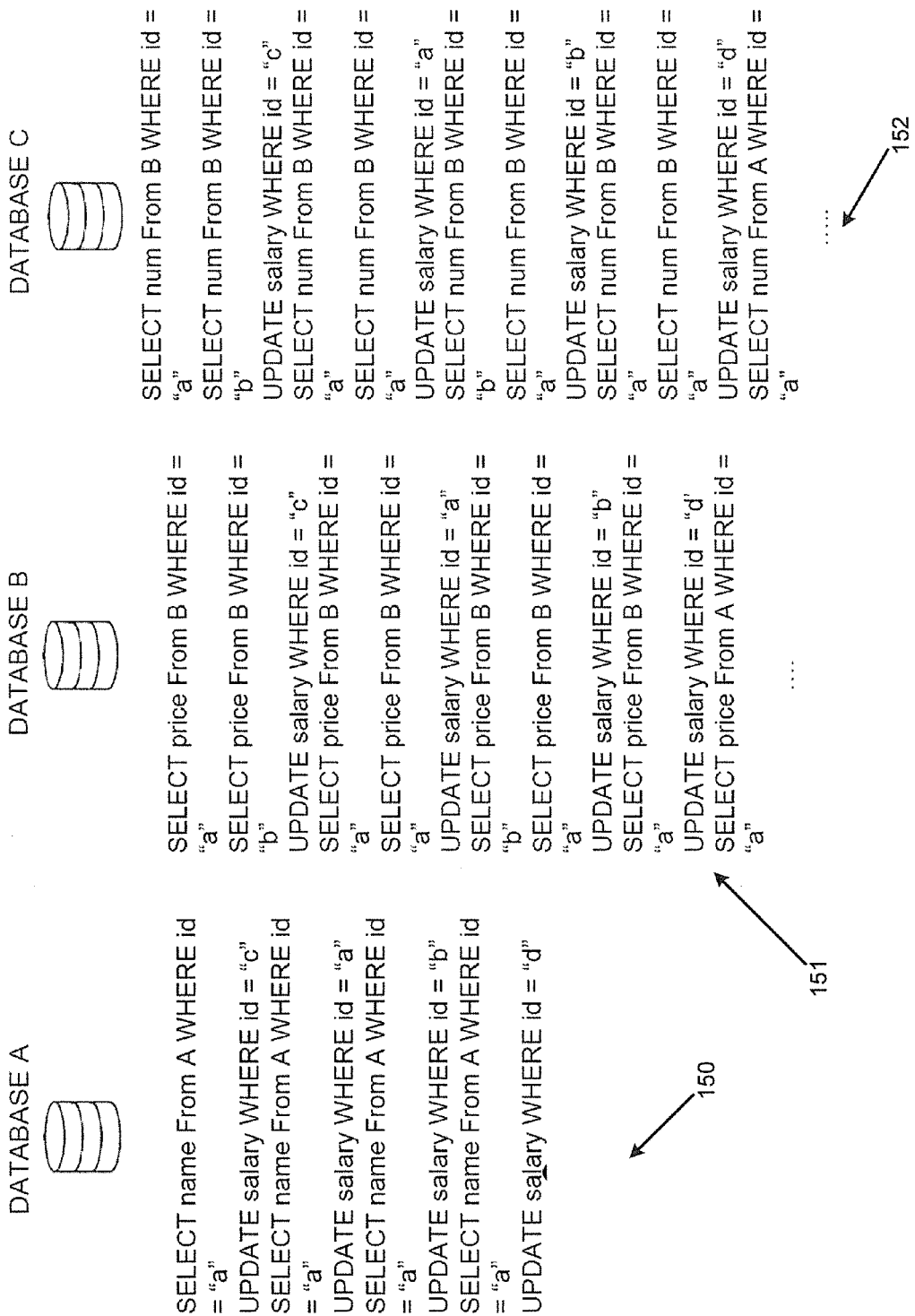
FIG. 5 illustrates trace log entries for databases, according to an example of the present disclosure.
Figure 6:
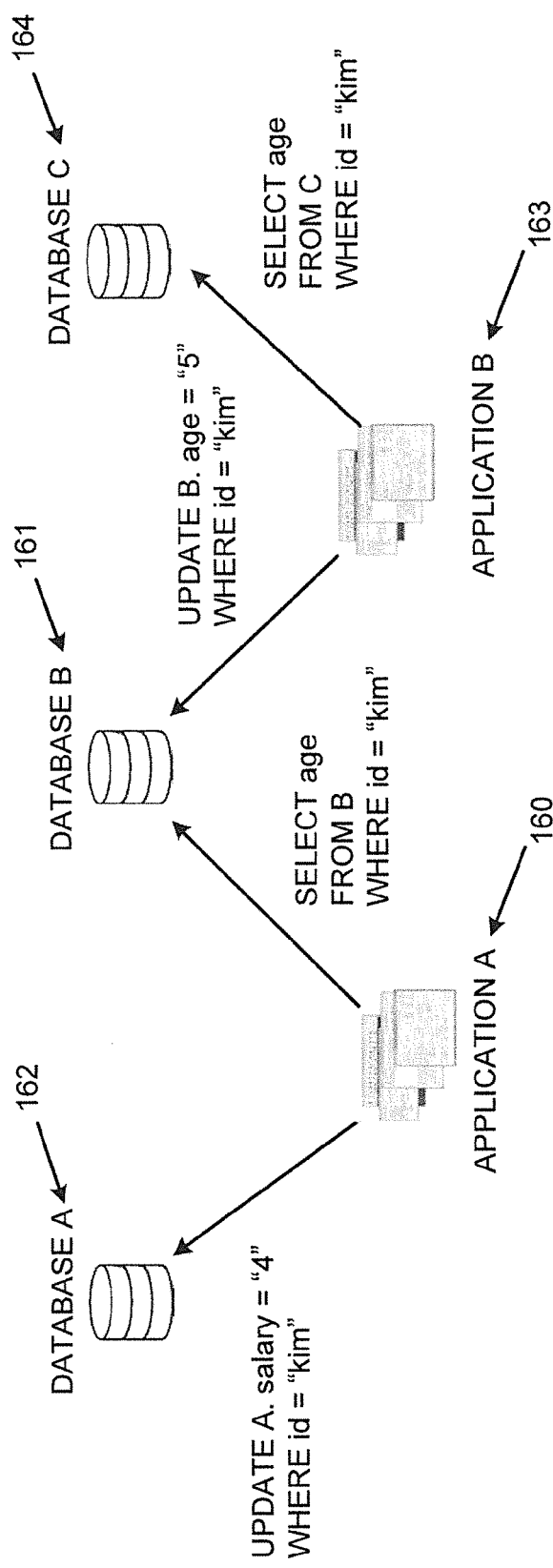
FIG. 6 illustrates examples of commands by applications on different databases, according to an example of the present disclosure.
Figure 7:
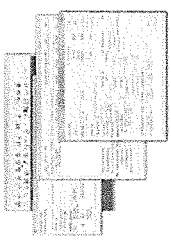
FIG. 7 illustrates a group of trace log commands for an application, according to an example of the present disclosure.

Referring to FIG. 5, the data lineage flow determination module 120 may link trace log entries 150, 151 and 152, respectively, for databases A, B and C, to determine data lineage flow. The module 120 may discover a data lineage flow of the SQL commands that are used to create a value. The trace log files from multiple databases may include commands performed by multiple applications. For example, as shown in FIG. 6, application A at 160 may perform a SELECT command on database B at 161 followed by an UPDATE command on database A at 162. Further, application B at 163 may perform a SELECT command on the database C at 164 followed by an UPDATE command on database B at 161. In order to account for different applications that may perform different commands on different databases, the module 120 may identify temporal differences between SQL commands. In order to obtain relevant SQL commands, the module 120 may use a statistics based data mining approach that may discover the sequence of commands that an application may perform. The statistics based approach may be based on a first principle that a sequence of commands is executed repeatedly. For example, as shown in FIG. 6, the application A at 160 performs a SELECT command followed by an UPDATE command. Thus, the module 120 may mine a SELECT followed by an UPDATE, and further such command pairs, for application A. Secondly, the time intervals (i.e., temporal duration) between consecutive commands (e.g., SELECT and UPDATE) are generally consistent. Based on the foregoing principles, high-level command patterns may be captured to associate individual commands by the module 120. These principles also impart robustness and scalability to the data lineage tracking system 100. Specifically, the foregoing principles impart robustness to the system 100 to noise in trace log entries, for example, due to missing trace log entries or inadvertent modification from runtime issues. The foregoing principles also impart scalability to the system 100, in that operation of the system 100 is linear to the total number of SQL records (i.e., n), and the average number of the types of SQL commands per application (i.e., k), where the time efficiency may be determined as O(n*k), where the notation O may be used to characterize the upper bound of time complexity for a process.

Figure 8:
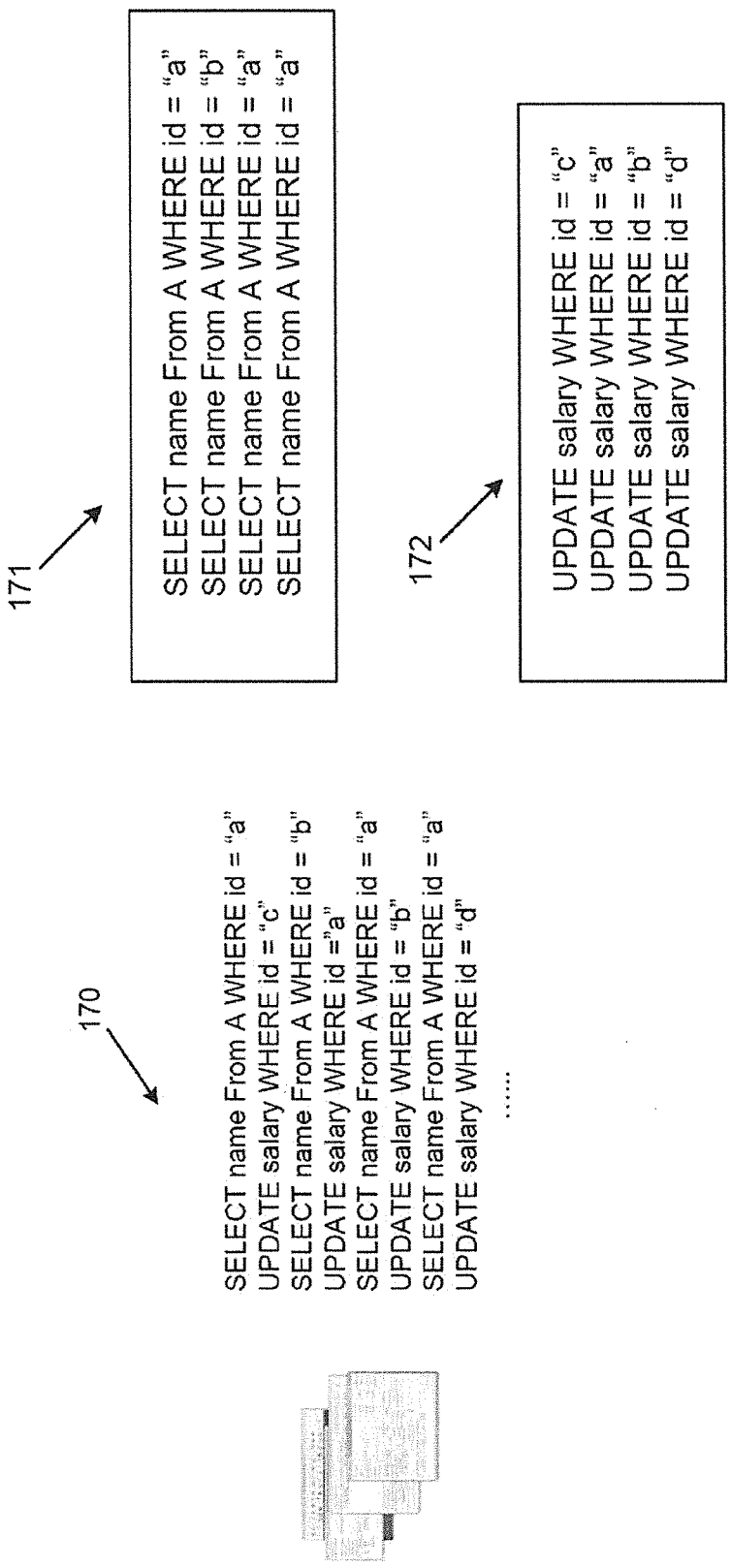
FIG. 8 illustrates clustering of trace log commands, according to an example of the present disclosure.
Figure 9:
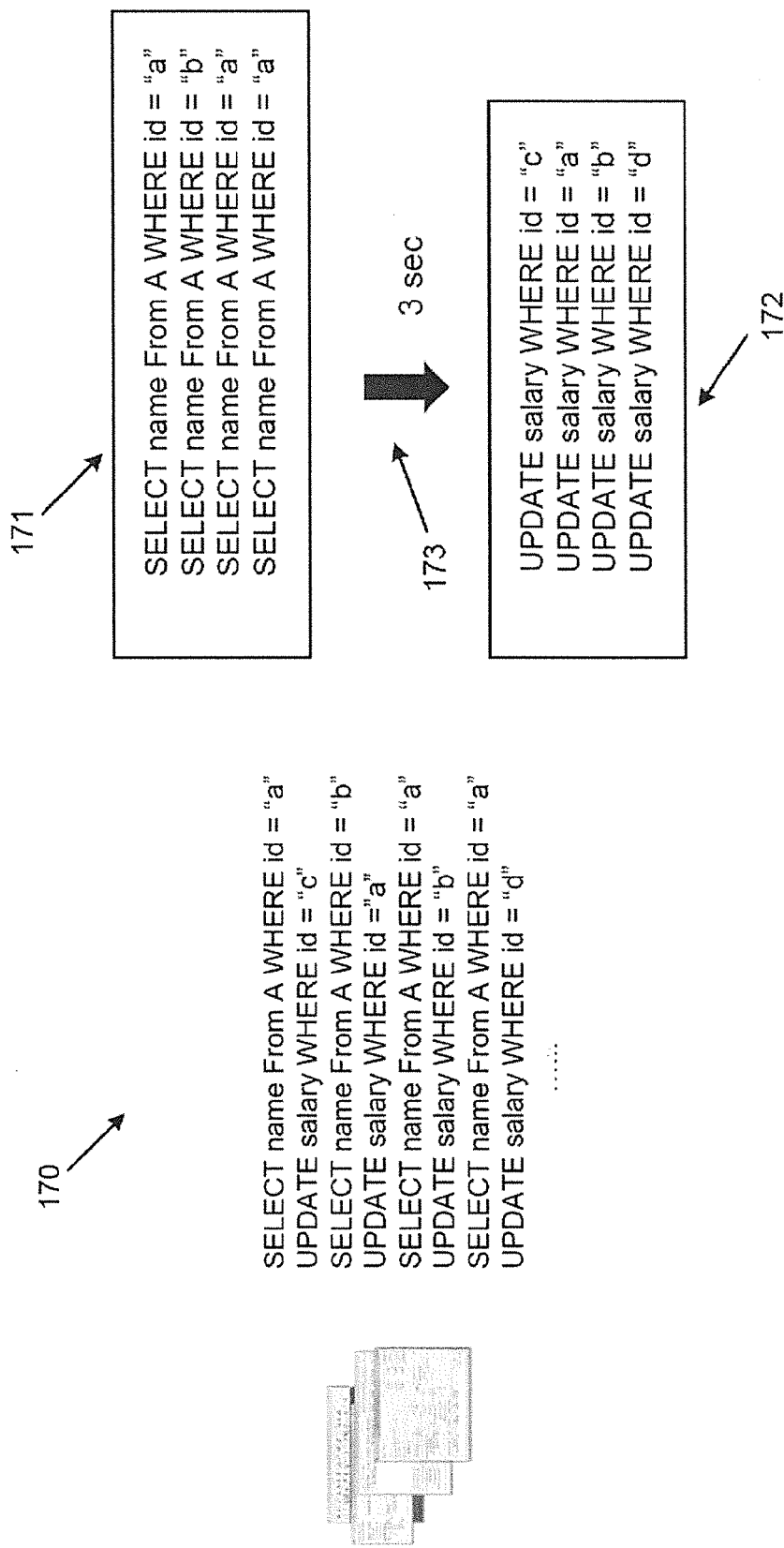
FIG. 9 illustrates measurement of variability of temporal differences between trace log entries in cluster pairs, according to an example of the present disclosure.

With the sequence of commands performed by an application obtained per the foregoing statistics based data mining approach, for each application, the data lineage flow determination module 120 may group the trace log commands issued. For example, referring to FIG. 7, an example is shown of a group 170 of trace log commands issued for an application. Referring to FIG. 8, the grouped trace log commands may be clustered into clusters 171, 172, for example, according to the tables that are affected and attributes involved. For example, the trace log commands (e.g., "SELECT name From A WHERE id="x"") for cluster 171 may be clustered together because the command type, table name, and attribute name are identical. The groupings may also be based on the principle that an application generally executes a sequence of commands repeatedly with consistent time intervals (e.g., 3 seconds as shown at 173 in FIG. 9) between the commands. For every pair of command type clusters, the module 120 may measure the variability of the temporal difference between trace log entries in the two clusters. Given the command clusters, 171 and 172, the module 120 may identify the mappings of traces between the two command clusters. A command-timestamp pair, $(s_1, t_1)$, may be mapped to another command-timestamp pair, $(s_2, t_2)$, by satisfying the conditions discussed above (i.e., there does not exist a $s_1'$ in $c_1$ such that $|t_1'-t_2|<|t_1-t_2|$, and there does not exist a $s_2'$ in $c_2$ such that $|t_1'-t_2|<|t_1-t_2|$). For example, command-timestamp pair $(s_1, t_1)$ (e.g., "SELECT name From A WHERE id="a"" which occurs at timestamp $t_1$ for cluster 171), may be mapped to command-timestamp pair $(s_2, t_2)$ (e.g., "UPDATE salary WHERE id="c"" which occurs at timestamp $t_2$ for cluster 172) if the foregoing conditions are satisfied. The command $s_2$ for the command-timestamp pair $(s_2, t_2)$ may also represent the command that occurs right after the command $s_1$ for the command-timestamp pair $(s_1, t_1)$.

Figure 10:
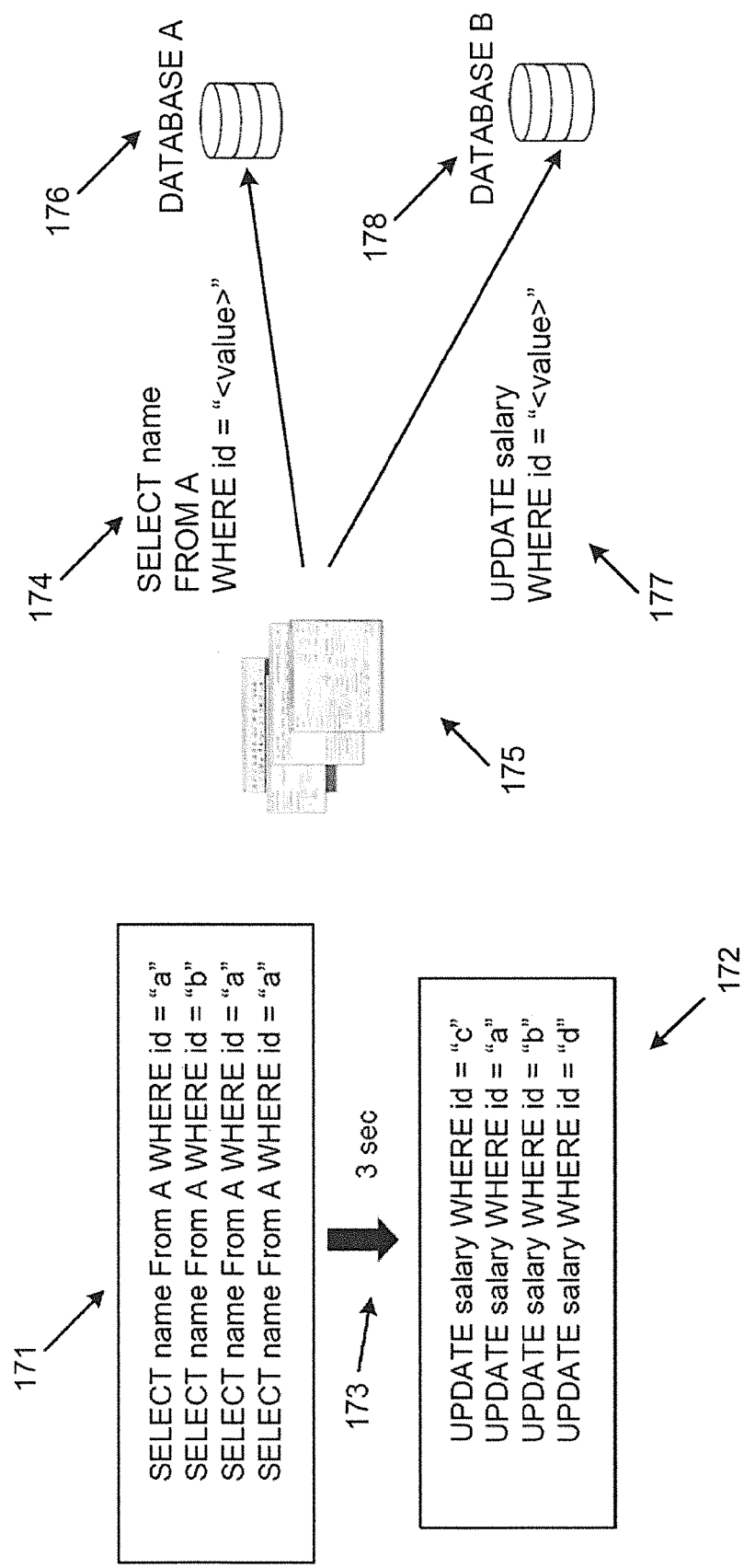
FIG. 10 illustrates construction of cluster chains, according to an example of the present disclosure.

Referring to FIG. 10, for the clusters 171, 172, once the mappings are identified, the data lineage flow determination module 120 may calculate the entropy of the temporal differences (i.e., $t_1-t_2$) to measure the consistency of the temporal differences. The entropy may provide a measure of the uncertainty associated between the temporal differences. A high entropy equates to a significant variance in a list of temporal differences, as opposed to a low entropy. For example, if the temporal differences are [1, 5, 10, 100, 3, 0], the entropy would be higher than temporal differences of [3.1, 3.0, 2.9, 3.1, 3.0]. This is because the values of the former list are much different than one another as opposed to the values of the second list which are concentrated around 3.0. The entropy may be calculated from the following equation:

$$-\Sigma_{k=0}{}^n p(x_k) \log p(x_k) \qquad \text{Equation (1)}$$

For Equation (1), $$x_k = \frac{N_k}{N},$$

where N may represent the total number of values in the list and $N_k$ may represent the total number of values that are k. For the values [3.1, 3.0, 2.9, 3.1, 3.0], the entropy may be determined as follows:

$$-p(2.9)*\log p(2.9) - p(3.0)*\log p(3.0) - p(3.1)*\log p(3.1) =$$

$$-\left(\frac{1}{5}\right)*\log\left(\frac{1}{5}\right) - \left(\frac{2}{5}\right)*\log\left(\frac{2}{5}\right) - \left(\frac{2}{5}\right)*\log\left(\frac{2}{5}\right)$$

Figure 14:
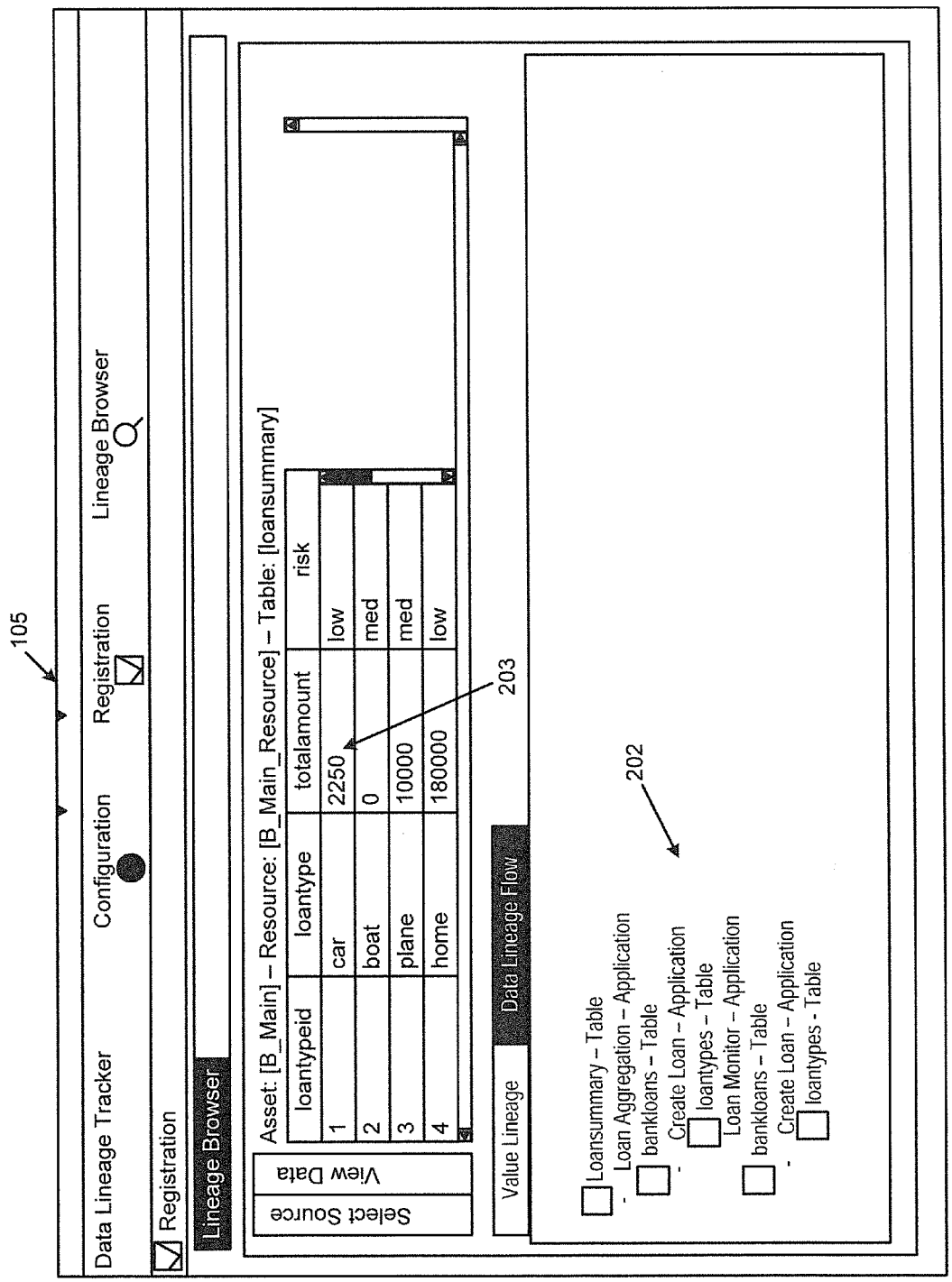
FIG. 14 illustrates a display of data lineage flow information for the user interface layout, according to an example of the present disclosure.
Figure 15:
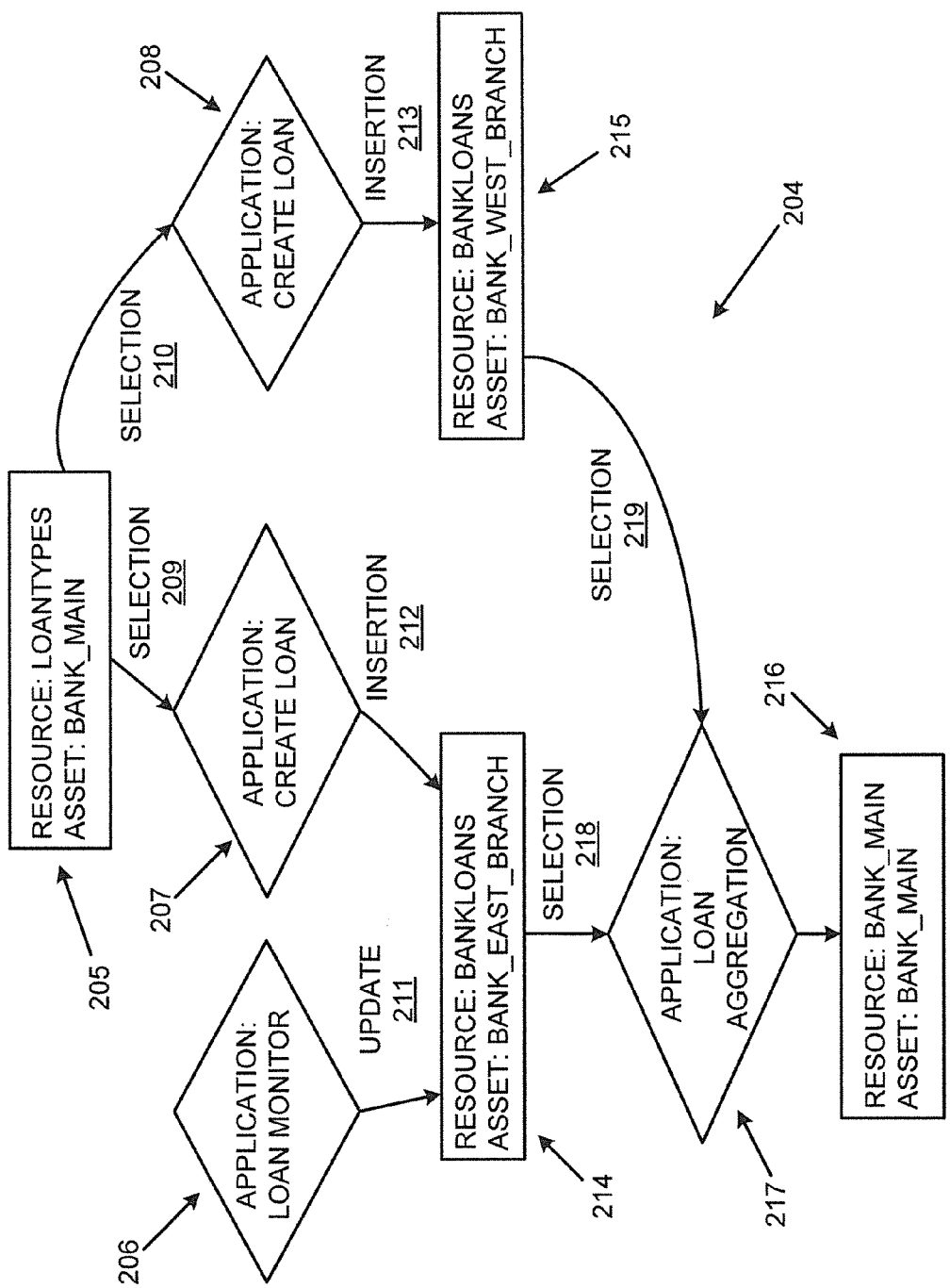
FIG. 15 illustrates a graphical display of data lineage flow information, according to an example of the present disclosure.

Based on the entropy determination, the module 120 may select the pairs of the command clusters whose entropy score is lower than a given threshold, which may be user-defined. The module 120 may construct a cluster chain $C=\{c_1, c_2, \ldots, c_n\}$ (e.g., the clusters 171, 172 of FIG. 10) of low entropies which corresponds to a sequence of trace entries that an application performs. The cluster chains may represent the data lineage flow graph across different databases. Based on the cluster chains, instance-level flows as described below may be derived. Based on the cluster chain, the module 120 may determine data lineage flow for a set of SQL commands that contribute to instances of existing values across multiple backlog trace entries. For example, as shown in FIG. 10, for value "a", the module 120 may determine that the data lineage flow includes a SELECT command at 174 from an application 175 to a database A at 176. The module 120 may further determine that the data lineage flow includes an UPDATE command at 177 from the application 175 to a database A at 178, and so forth for other commands. For example, the module 120 may use the mappings established between the clusters 171 and 172 to choose the UPDATE SQL. In this manner, the module 120 may generate a data lineage flow for an application (e.g., application 175), what commands are performed by the application (e.g., commands 174 and/or 177), and what databases are involved (e.g., database A at 178 and/or database B at 178). For each application involved, the module 120 may similarly determine associated commands and what databases are involved to generate data lineage flows as illustrated in FIGS. 14 and 15, and described in further detail below.

Referring to FIGS. 1 and 11, as discussed above, the configuration module 117 in conjunction with the data lineage browser 105 may register assets, resources, and applications specified at the browser 105. The data lineage browser 105 may include options 180, 181 and 182 to respectively register assets, resources, and applications. Alternatively, resources may be automatically discovered by using option 183. A user may specify the resource specifics at 184, the type of modality (e.g., monitor or mediation) at 185, and monitor rate at 186.

Figure 12:
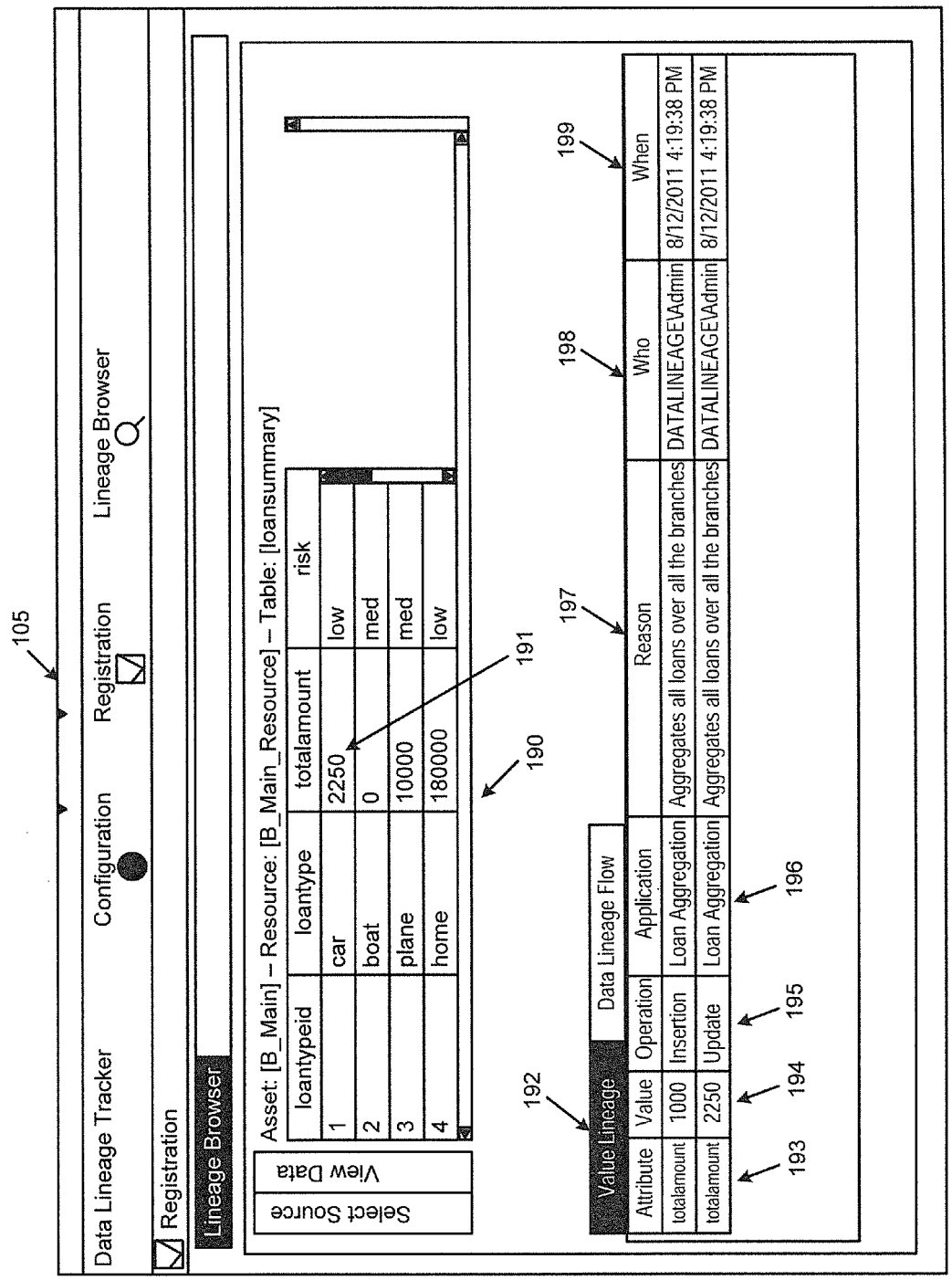
FIG. 12 illustrates a display of aggregated data value lineage information for the user interface layout, according to an example of the present disclosure.

Referring to FIGS. 1 and 12, the data lineage browser 105 may display aggregated data value lineage information, for example, in a table format as shown at 190. A user may select a value (e.g., the value 2250 at 191) and obtain its data value lineage information at 192. The lineage information may include, for example, the attribute name at 193, value at 194, type of operation at 195, application at 196, reason for why the data value was inserted or updated at 197, who made a change at 198 and the time of the change at 199. As discussed above, the reason for why the data value was inserted or updated may be determined by the inference module 121.

Referring to FIGS. 1 and 13, the aggregated data value lineage information may be displayed in another application (e.g., MICROSOFT EXCEL) at 200. For the data value lineage information, any anomalies detected by the data value lineage determination module 119 may be highlighted and displayed at 201. For example, if a data value differs from an initial value by greater than a predetermined percentage, or if a data value is changed, any such change or deviation may be displayed at 201.

Referring to FIGS. 1 and 14, the data lineage browser 105 may display data lineage flow information, for example, as shown at 202. For example, a user may select the data value 2250 at 203 to display its data lineage flow information of all applications and tables (i.e., from databases) that were used to create the value.

Referring to FIGS. 1, 10 and 15, the data lineage flow information may also be displayed in a graphical format as shown at 204. For example, the graphically displayed data lineage flow information may include resource and asset information at 205, and application information at 206, 207 and 208. The type of operation performed by applications may be displayed at 209-213. Further, other resource and asset information may be provided at 214, 215 and 216, and application information at 217. The type of operation performed by applications may be displayed at 218 and 219. In this manner, as also discussed above with reference to FIG. 10, a user may be presented with a graphical view of the different resources, assets and applications, and the type of commands that impacted a data value lineage.

3. Method

Figure 16:
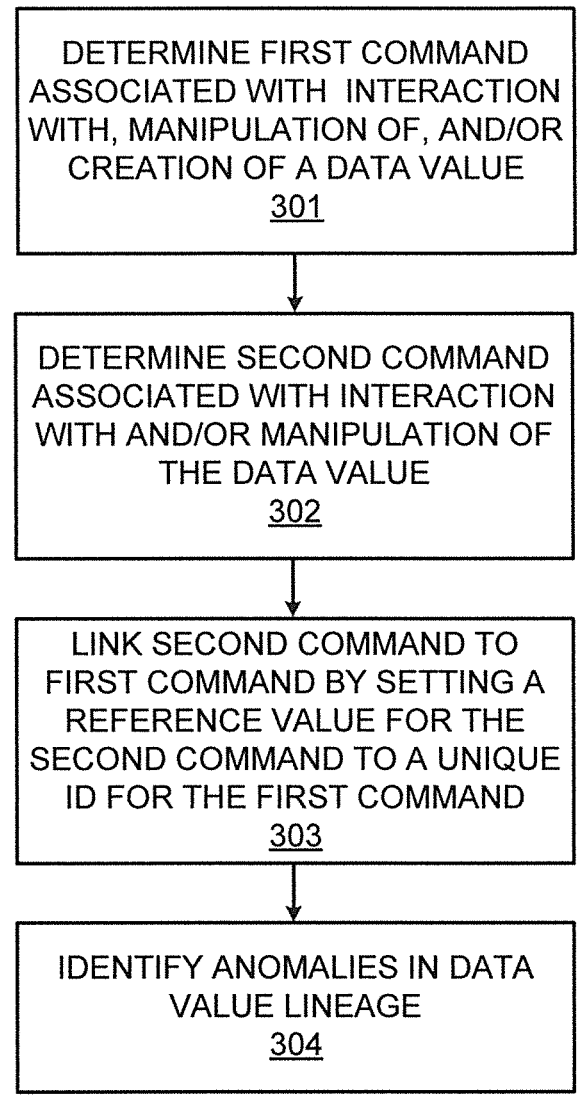
FIG. 16 illustrates a method for data lineage tracking, according to an example of the present disclosure.
Figure 17:
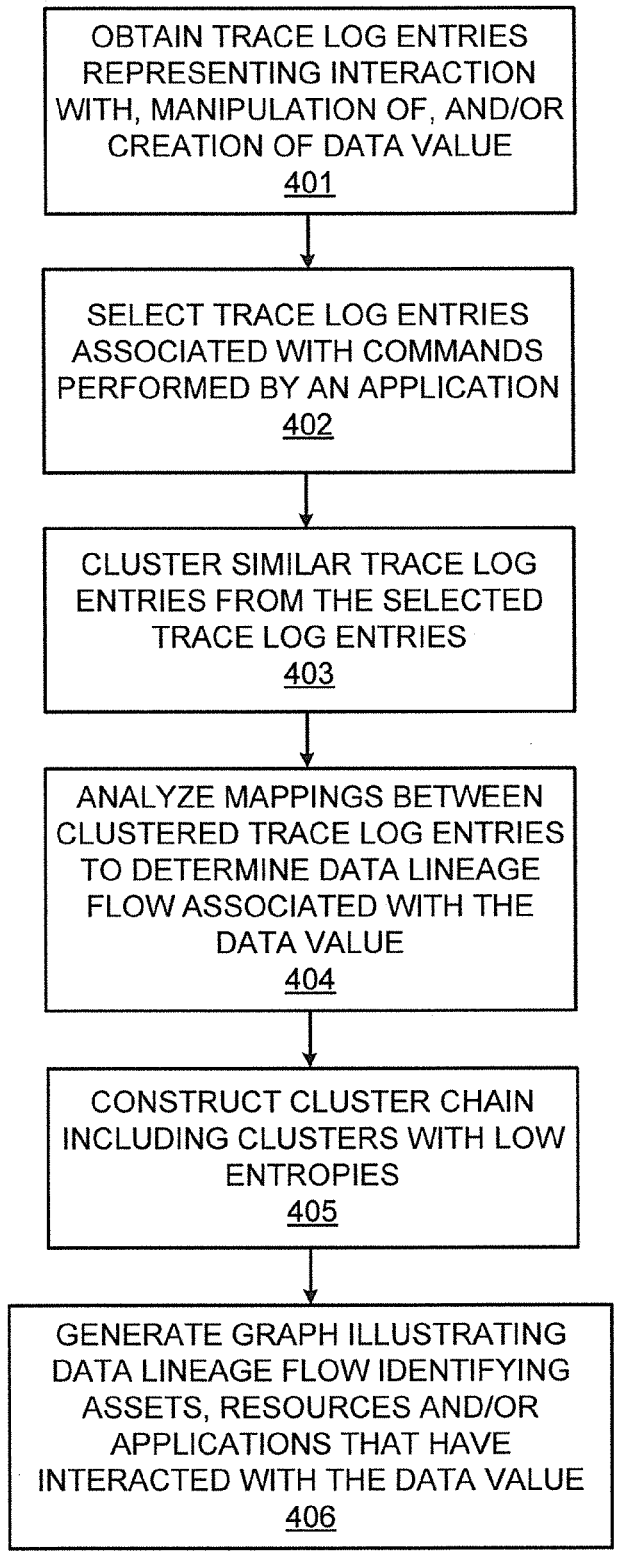
FIG. 17 illustrates further details of the method for data lineage tracking, according to an example of the present disclosure.

FIGS. 16 and 17 illustrate flowcharts of methods 300 and 400 for data lineage tracking, according to examples. The methods 300 and 400 may be implemented on the data lineage tracking system described above with reference to FIGS. 1-15 by way of example and not limitation. The methods 300 and 400 may be practiced in other systems.

Referring to FIG. 16, at block 301, a first command associated with an interaction with, a manipulation of, and/or a creation of the data value, may be determined. For example, referring to FIG. 1, the data traces captured by the mediation or monitor modules 107, 112 may be initially received by the modules of the driver layer 103. The data traces may be analyzed to determine the backlog trace, which transforms the data traces into the data lineage format stored in the database 124 of the repository module 106. For the example of FIG. 3, for the data 130 of FIG. 2A, the initial data may be entered as a series of inserts.

At block 302, a second command associated with an interaction with and/or a manipulation of the data value, may be determined. For the example of FIG. 4, following, for example, update and insert commands at 144, 145, respectively (i.e., "UPDATE users SET Age=25 WHERE userid=1" and "INSERT INTO users VALUES (1, 'Dan', 30)"), the backlog trace may be transformed as shown at 146.

At block 303, the second command may be linked to the first command by setting a reference value for the second command to a unique ID for the first command. For example, as discussed above with reference to FIGS. 2A-4, the data value lineage determination module 119 may perform an insertion of any command that manipulates any existing data (i.e., the data 130) and link the inserted command to the last command that performed any manipulation.

At block 304, an anomaly in data value lineage may be identified by calculating a change in the data value. For example, referring to FIGS. 1 and 13, any anomalies detected by the data value lineage determination module 119 may be highlighted and displayed at 201.

For the method 400, referring to FIG. 17, at block 401, trace log entries representing an interaction with, a manipulation of, and/or a creation of a data value may be obtained. For example, referring to FIGS. 1 and 5, the data lineage flow determination module 120 may link trace log entries 150, 151 and 152, respectively, for databases A, B and C, to determine data lineage flow.

At block 402, the trace log entries that are associated with commands performed by an application may be selected. For example, referring to FIG. 1, in order to determine sequences for applications, since an application generally executes a sequence of commands repeatedly with consistent time intervals between the commands, for each application, the data lineage flow determination module 120 may group the trace log commands issued by an application.

At block 403, similar trace log entries from the selected trace log entries may be clustered. The similar trace log entries may be clustered based, for example, on a command type, a table name, and/or an attribute name. For example, referring to FIGS. 1 and 8, for each application, the data lineage flow determination module 120 may cluster similar trace log entries.

At block 404, mappings between the clustered trace log entries may be analyzed to determine data lineage flow associated with the data value. For example, the data lineage flow determination module 120 may map a command-timestamp pair, $(s_1, t_1)$, for a cluster $c_1$ to another command-timestamp pair, $(s_2, t_2)$, for a cluster $c_2$, if there does not exist a $s_1'$ in cluster $c_1$ such that $|t_1'-t_2|<|t_1-t_2|$, and there does not exist a $s_2'$ in cluster $c_2$ such that $|t_1'-t_2|<|t_1-t_2|$. Variability of temporal differences between the trace log entries in cluster pairs may be measured by calculating entropy of the temporal differences to determine a consistency of the temporal differences.

At block 405, a cluster chain including clusters with low entropies may be constructed. For example, referring to FIGS. 1 and 10, the data lineage flow determination module 120 may construct a cluster chain $C=\{c_1, c_2, \ldots, c_n\}$ of low entropies (i.e., entropies that fall below a predetermined threshold, which may be user-defined), which correspond to a sequence of trace log entries that an application performs, and the data lineage flow.

At block 406, a graph illustrating the data lineage flow identifying an asset, a resource and/or the application that have interacted with the data value, may be generated. For example, referring to FIGS. 1, 14 and 15, the data lineage browser 105 may display data lineage flow information, for example, as shown at 202 in FIG. 14, or in a graphical format as shown at 204 in FIG. 15.

4. Computer Readable Medium

Figure 18:
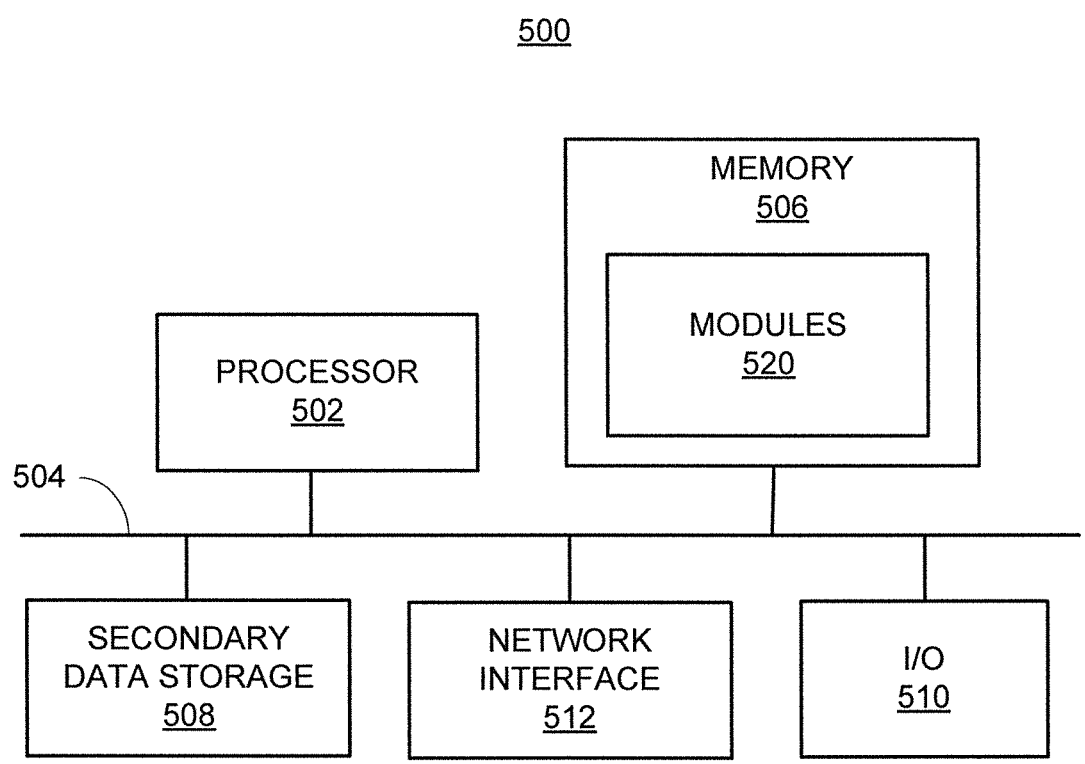
FIG. 18 illustrates a computer system, according to an example of the present disclosure.

FIG. 18 shows a computer system 500 that may be used with the examples described herein. The computer system 500 represents a generic platform that includes components that may be in a server or another computer system. The computer system 500 may be used as a platform for the system 100. The computer system 500 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 includes a processor 502 that may implement or execute machine readable instructions performing some or all of the methods, functions and other processes described herein. Commands and data from the processor 502 are communicated over a communication bus 504. The computer system 500 also includes a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include modules 520 including machine readable instructions residing in the memory 506 during runtime and executed by the processor 502. The modules 520 may include the modules of the system 100 described with reference to FIGS. 1-15.

The computer system 500 may include an I/O device 510, such as a keyboard, a mouse, a display, etc. The computer system 500 may include a network interface 512 for connecting to a network. Other known electronic components may be added or substituted in the computer system 500.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A data lineage tracking system comprising:
a processor; and
a memory storing machine readable instructions that when executed by the processor cause the processor to:
obtain trace log entries representing at least one of an interaction with a data value, a manipulation of the data value, and a creation of the data value;
select, from the obtained trace log entries, trace log entries that are associated with commands performed by an application;
cluster similar trace log entries from the selected trace log entries;
measure variability of temporal differences between the trace log entries in cluster pairs by calculating entropy of the temporal differences to determine a consistency of the temporal differences, wherein
the entropy represents a measure of uncertainty associated with the temporal differences,
a relatively high entropy score represents a high variation in the temporal differences, and
a relatively low entropy score represents a low variation in the temporal differences;
map a command-timestamp pair, $(s_1, t_1)$, for a cluster $c_1$ to another command-timestamp pair, $(s_2, t_2)$, for a cluster $c_2$, when there does not exist a $s_1'$ in cluster $c_1$ such that $|t_1'-t_2|<|t_1-t_2|$, and there does not exist a $s_2'$ in cluster $c_2$ such that $|t_1'-t_2|<|t_1-t_2|$, wherein the $s_1$ is a trace log entry command from the cluster $c_1$ and the $t_1$ is a timestamp for the trace log entry command $s_1$, the $s_1'$ is a trace log entry command from the cluster $c_1$ and the $t_1'$ is a timestamp for the trace log entry command $s_1'$, the $s_2$ is a trace log entry command from the cluster $c_2$ and the $t_2$ is a timestamp for the trace log entry command $s_2$, and the $s_2'$ is a trace log entry command from the cluster $c_2$;

analyze the mappings between the clustered trace log entries to determine data lineage flow associated with the data value by
identifying each cluster of a plurality of clusters for which an entropy falls below a predetermined entropy threshold, wherein entropies below the predetermined entropy threshold represent a low entropy, and
constructing a cluster chain including clusters with the low entropies to generate the data lineage flow;
determine data value lineage by
determining a first command associated with at least one of an interaction with, a manipulation of, and a creation of the data value,
determining a second command associated with at least one of an interaction with and a manipulation of the data value, and
linking the second command to the first command;
determine, based on the data value lineage associated with the data value, whether the data value is authentic; and
in response to a determination that the data value is authentic, generate, based on the data value, a report with respect to different systems associated with the data value and the application.

2. The data lineage tracking system of claim 1, wherein the similar trace log entries are clustered based on at least one of a command type, a table name, and an attribute name.

3. The data lineage tracking system of claim 1, wherein the machine readable instructions to determine the data value lineage further comprise machine readable instructions that when executed by the processor further cause the processor to:
link the second command to the first command by setting a reference value for the second command to a unique identification (ID) for the first command.

4. The data lineage tracking system of claim 1, further comprising machine readable instructions that when executed by the processor further cause the processor to:
determine a reason for a command of the commands based on an analysis of an asset, a resource and the application registered with the data lineage tracking system, wherein the reason for the command is based on a historical analysis of interactions with the asset, the resource and the application.

5. The data lineage tracking system of claim 1, further comprising machine readable instructions that when executed by the processor further cause the processor to:
identify an anomaly in the data value lineage based on a determination of whether a change in the data value exceeds a predetermined percentage.

6. The data lineage tracking system of claim 1, further comprising machine readable instructions that when executed by the processor further cause the processor to:
generate a graph illustrating the data lineage flow identifying at least one of an asset, a resource and the application that have interacted with the data value.

7. The data lineage tracking system of claim 1, further comprising machine readable instructions that when executed by the processor further cause the processor to:
receive calls from data sources, wherein the calls include structured query language (SQL) queries and NoSQL inserts and updates.

8. The data lineage tracking system of claim 1, further comprising machine readable instructions that when executed by the processor further cause the processor to:

poll data sources for structured query language (SQL) queries and NoSQL inserts and updates.

9. A data lineage tracking system comprising:
a processor; and
a memory storing machine readable instructions that when executed by the processor cause the processor to:
  obtain trace log entries representing at least one of an interaction with a data value, a manipulation of the data value, and a creation of the data value;
  select, from the obtained trace log entries, trace log entries that are associated with commands performed by an application;
  cluster similar trace log entries from the selected trace log entries;
  measure variability of temporal differences between the trace log entries in cluster pairs by calculating entropy of the temporal differences to determine a consistency of the temporal differences, wherein
    the entropy represents a measure of uncertainty associated with the temporal differences,
    a relatively high entropy score represents a high variation in the temporal differences, and
    a relatively low entropy score represents a low variation in the temporal differences;
  map a command-timestamp pair, $(s_1, t_1)$, for a cluster $c_1$ to another command-timestamp pair, $(s_2, t_2)$, for a cluster $c_2$, when there does not exist a $s_1'$ in cluster $c_1$ such that $|t_1'-t_2|<|t_1-t_2|$, and there does not exist a $s_2'$ in cluster $c_2$ such that $|t_1'-t_2|<|t_1-t_2|$, wherein the $s_1$ is a trace log entry command from the cluster $c_1$ and the $t_1$ is a timestamp for the trace log entry command $s_1$, the $s_1'$ is a trace log entry command from the cluster $c_1$ and the $t_1'$ is a timestamp for the trace log entry command $s_1'$, the $s_2$ is a trace log entry command from the cluster $c_2$ and the $t_2$ is a timestamp for the trace log entry command $s_2$, and the $s_2'$ is a trace log entry command from the cluster $c_2$;
  analyze the mappings between the clustered trace log entries to determine data lineage flow associated with the data value by
    identifying each cluster of a plurality of clusters for which an entropy falls below a predetermined entropy threshold, wherein entropies below the predetermined entropy threshold represent a low entropy, and
    constructing a cluster chain including clusters with the low entropies to generate the data lineage flow;
  determine data value lineage by
    determining a first command associated with at least one of an interaction with, a manipulation of, and a creation of the data value,
    determining a second command associated with at least one of an interaction with and a manipulation of the data value, and
    linking the second command to the first command by setting a reference value for the second command to a unique identification (ID) for the first command;
  determine, based on the data value lineage associated with the data value, whether the data value is authentic; and
  in response to a determination that the data value is authentic, generate, based on the data value, a report with respect to different systems associated with the data value and the application.

10. The data lineage tracking system of claim 9, further comprising machine readable instructions that when executed by the processor further cause the processor to:
  identify an anomaly in the data value lineage based on a determination of whether a change in the data value exceeds a predetermined percentage.

11. The data lineage tracking system of claim 9, wherein the similar trace log entries are clustered based on at least one of a command type, a table name, and an attribute name.

12. The data lineage tracking system of claim 9, further comprising machine readable instructions that when executed by the processor further cause the processor to:
  generate a graph illustrating the data lineage flow identifying at least one of an asset, a resource and the application that have interacted with the data value.

13. The data lineage tracking system of claim 9, further comprising machine readable instructions that when executed by the processor further cause the processor to:
  receive calls from data sources, wherein the calls include structured query language (SQL) queries and NoSQL inserts and updates.

14. The data lineage tracking system of claim 9, further comprising machine readable instructions that when executed by the processor further cause the processor to:
  poll data sources for structured query language (SQL) queries and NoSQL inserts and updates.

15. A method for data lineage tracking, the method comprising:
  obtaining trace log entries representing at least one of an interaction with, a manipulation of, and a creation of a data value;
  selecting, from the obtained trace log entries, trace log entries that are associated with commands performed by an application;
  clustering similar trace log entries from the selected trace log entries;
  measuring variability of temporal differences between the trace log entries in cluster pairs by calculating entropy of the temporal differences to determine a consistency of the temporal differences, wherein
    the entropy represents a measure of uncertainty associated with the temporal differences,
    a relatively high entropy score represents a high variation in the temporal differences, and
    a relatively low entropy score represents a low variation in the temporal differences;
  mapping a command-timestamp pair, $(s_1, t_1)$, for a cluster $c_1$ to another command-timestamp pair, $(s_2, t_2)$, for a cluster $c_2$, when there does not exist a $s_1'$ in cluster $c_1$ such that $|t_1'-t_2|<|t_1-t_2|$, and there does not exist a $s_2'$ in cluster $c_2$ such that $|t_1'-t_2|<|t_1-t_2|$, wherein the $s_1$ is a trace log entry command from the cluster $c_1$ and the $t_1$ is a timestamp for the trace log entry command $s_1$, the $s_1'$ is a trace log entry command from the cluster $c_1$ and the $t_1'$ is a timestamp for the trace log entry command $s_1'$, the $s_2$ is a trace log entry command from the cluster $c_2$ and the $t_2$ is a timestamp for the trace log entry command $s_2$, and the $s_2'$ is a trace log entry command from the cluster $c_2$;
  analyzing, by a processor, the mappings between the clustered trace log entries to determine data lineage flow associated with the data value by
    identifying each cluster of a plurality of clusters for which an entropy falls below a predetermined entropy threshold, wherein entropies below the predetermined entropy threshold represent a low entropy, and constructing a cluster chain including clusters with the low entropies to generate the data lineage flow;

determining a reason for a command of the commands based on an analysis of at least one of an asset, a resource and the application that performs the commands;

determining data value lineage by
  determining a first command associated with at least one of an interaction with, a manipulation of, and a creation of the data value,
  determining a second command associated with at least one of an interaction with and a manipulation of the data value, and
  linking the second command to the first command;

determining, based on the data value lineage associated with the data value, whether the data value is authentic; and in response to a determination that the data value is authentic, generating, based on the data value, a report with respect to different systems associated with the data value and the application.

16. The method of claim 15, wherein linking the second command to the first command further comprises:
  linking the second command to the first command by setting a reference value for the second command to a unique identification (ID) for the first command.

17. The method of claim 16, further comprising:
  identifying an anomaly in the data value lineage based on a determination of whether a change in the data value exceeds a predetermined percentage.

18. A non-transitory computer readable medium having stored thereon machine readable instructions for data lineage tracking, the machine readable instructions when executed cause a computer system to:
  obtain trace log entries representing at least one of an interaction with, a manipulation of, and a creation of a data value;
  select, from the obtained trace log entries, trace log entries that are associated with commands performed by an application;
  cluster similar trace log entries from the selected trace log entries;
  measure variability of temporal differences between the trace log entries in cluster pairs by calculating entropy of the temporal differences to determine a consistency of the temporal differences, wherein
    the entropy represents a measure of uncertainty associated with the temporal differences,
    a relatively high entropy score represents a high variation in the temporal differences, and
    a relatively low entropy score represents a low variation in the temporal differences;
  map a command-timestamp pair, $(s_1, t_1)$, for a cluster $c_1$ to another command-timestamp pair, $(s_2, t_2)$, for a cluster $c_2$, when there does not exist a $s_1'$ in cluster $c_1$ such that $|t_1'-t_2|<|t_1-t_2|$, and there does not exist a $s_2'$ in cluster $c_2$ such that $|t_1'-t_2|<|t_1-t_2|$, wherein the $s_1$ is a trace log entry command from the cluster $c_1$ and the $t_1$ is a timestamp for the trace log entry command $s_1$, the $s_1'$ is a trace log entry command from the cluster $c_1$ and the $t_1'$ is a timestamp for the trace log entry command $s_1'$, the $s_2$ is a trace log entry command from the cluster $c_2$ and the $t_2$ is a timestamp for the trace log entry command $s_2$, and the $s_2'$ is a trace log entry command from the cluster $c_2$;
  analyze, by a processor, the mappings between the clustered trace log entries to determine data lineage flow associated with the data value by
    identifying each cluster of a plurality of clusters for which an entropy falls below a predetermined entropy threshold, wherein entropies below the predetermined entropy threshold represent a low entropy, and
    constructing a cluster chain including clusters with the low entropies to generate the data lineage flow;
  determine a reason for a command of the commands based on an analysis of at least one of an asset, a resource and the application that performs the commands;
  determine data value lineage by
    determining a first command associated with at least one of an interaction with, a manipulation of, and a creation of the data value,
    determining a second command associated with at least one of an interaction with and a manipulation of the data value, and
    linking the second command to the first command;
  determine, based on the data value lineage associated with the data value, whether the data value is authentic; and
  in response to a determination that the data value is authentic, generate, based on the data value, a report with respect to different systems associated with the data value and the application.

19. The non-transitory computer readable medium of claim 18, wherein the similar trace log entries are clustered based on at least one of a command type, a table name, and an attribute name.

20. The non-transitory computer readable medium of claim 18, further comprising machine readable instructions that when executed cause the computer system to:
  identify an anomaly in the data value lineage based on a determination of whether a change in the data value exceeds a predetermined percentage.

* * * * *